(No Model.)
6 Sheets—Sheet 1.

G. C. COON.
MACHINE FOR WIRING CORKS IN BOTTLES.

No. 512,281.
Patented Jan. 9, 1894.

WITNESSES:

INVENTOR
George C. Coon
BY H. A. West
ATTORNEY (No Model.) 6 Sheets—Sheet 2.
G. C. COON.
MACHINE FOR WIRING CORKS IN BOTTLES.
No. 512,281. Patented Jan. 9, 1894.

WITNESSES:
INVENTOR
George C. Coon
BY H. A. West
ATTORNEY (No Model.) 6 Sheets—Sheet 3.

G. C. COON.
MACHINE FOR WIRING CORKS IN BOTTLES.

No. 512,281. Patented Jan. 9, 1894.

WITNESSES:
Alex Mayr
H. C. West

INVENTOR
George C. Coon
BY H. A. West
ATTORNEY

THE NATIONAL LITHOGRAPHING COMPANY,
WASHINGTON, D. C.

(No Model.) 6 Sheets—Sheet 4.
G. C. COON.
MACHINE FOR WIRING CORKS IN BOTTLES.

No. 512,281. Patented Jan. 9, 1894.

Fig: 4

WITNESSES:

INVENTOR
George C. Coon
BY H. A. West
ATTORNEY (No Model.) 6 Sheets—Sheet 5.

G. C. COON.
MACHINE FOR WIRING CORKS IN BOTTLES.

No. 512,281. Patented Jan. 9, 1894.

WITNESSES:
Alex Duayl
H. C. West

INVENTOR
George C. Coon
BY H. A. West
ATTORNEY (No Model.) 6 Sheets—Sheet 6.
G. C. COON.
MACHINE FOR WIRING CORKS IN BOTTLES.
No. 512,281. Patented Jan. 9, 1894.
Fig: 8.
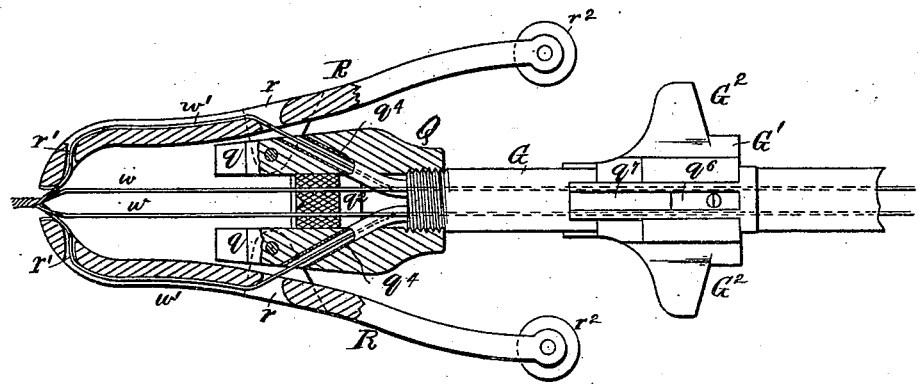
Fig: 9.
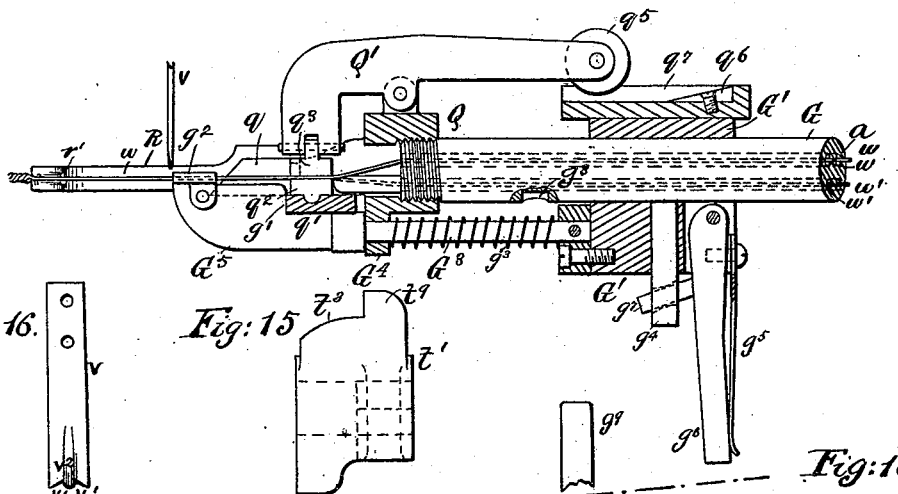
Fig: 16. 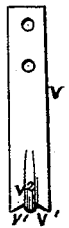
Fig: 15. 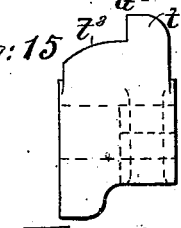
Fig: 10. 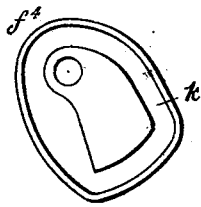
Fig: 11. 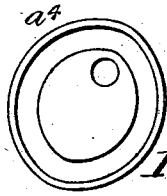
Fig: 12. 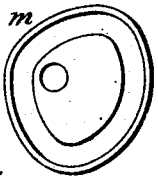
Fig: 13. 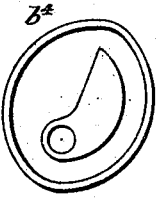
Fig: 14. 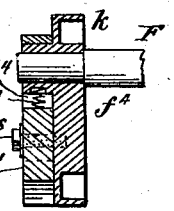
WITNESSES:
Alex Mayer
H. C. Krest
INVENTOR
George C. Coon
BY H. A. West
ATTORNEY

UNITED STATES PATENT OFFICE.

GEORGE C. COON, OF ELIZABETH, NEW JERSEY, ASSIGNOR TO FREDERICK G. VAN VLIET, OF NEW YORK, N. Y..

MACHINE FOR WIRING CORKS IN BOTTLES.

SPECIFICATION forming part of Letters Patent No. 512,281, dated January 9, 1894.

Application filed September 20, 1893. Serial No. 485,980. (No model.)

*To all whom it may concern:*

Be it known that I, GEORGE C. COON, a citizen of the United States, and a resident of Elizabeth, in the county of Union and State of New Jersey, have invented certain new and useful Improvements in Machines for Wiring Corks in Bottles, of which the following is a specification.

My invention relates to machines for wiring corks in bottles, and my object is to simplify and enhance the efficiency and durability of the machine, and to this end my invention consists of the construction, arrangement and combinations of the machine and its parts, all as hereinafter described and claimed.

Figure 1:
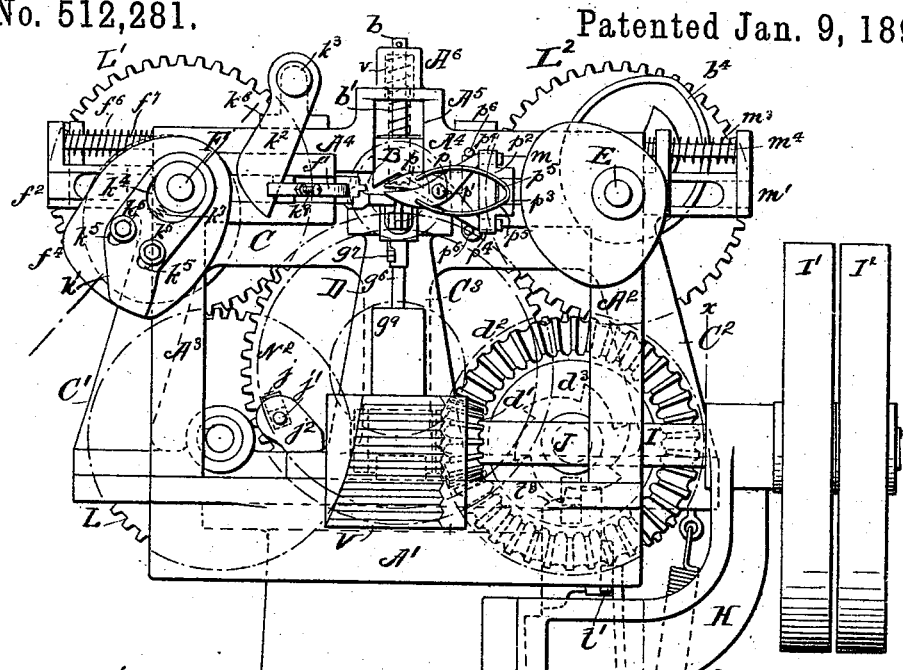
Figure 2:
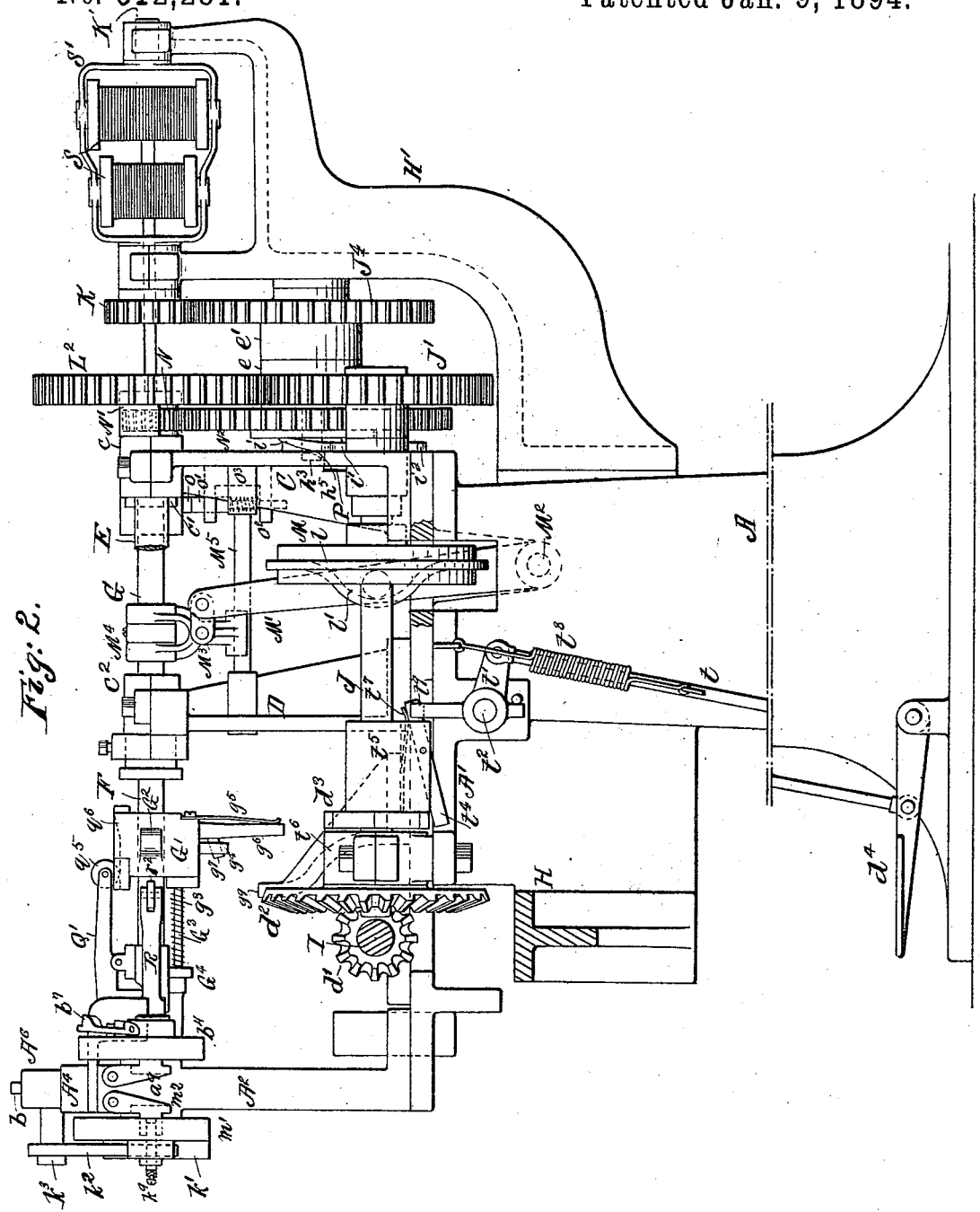
Figure 3:
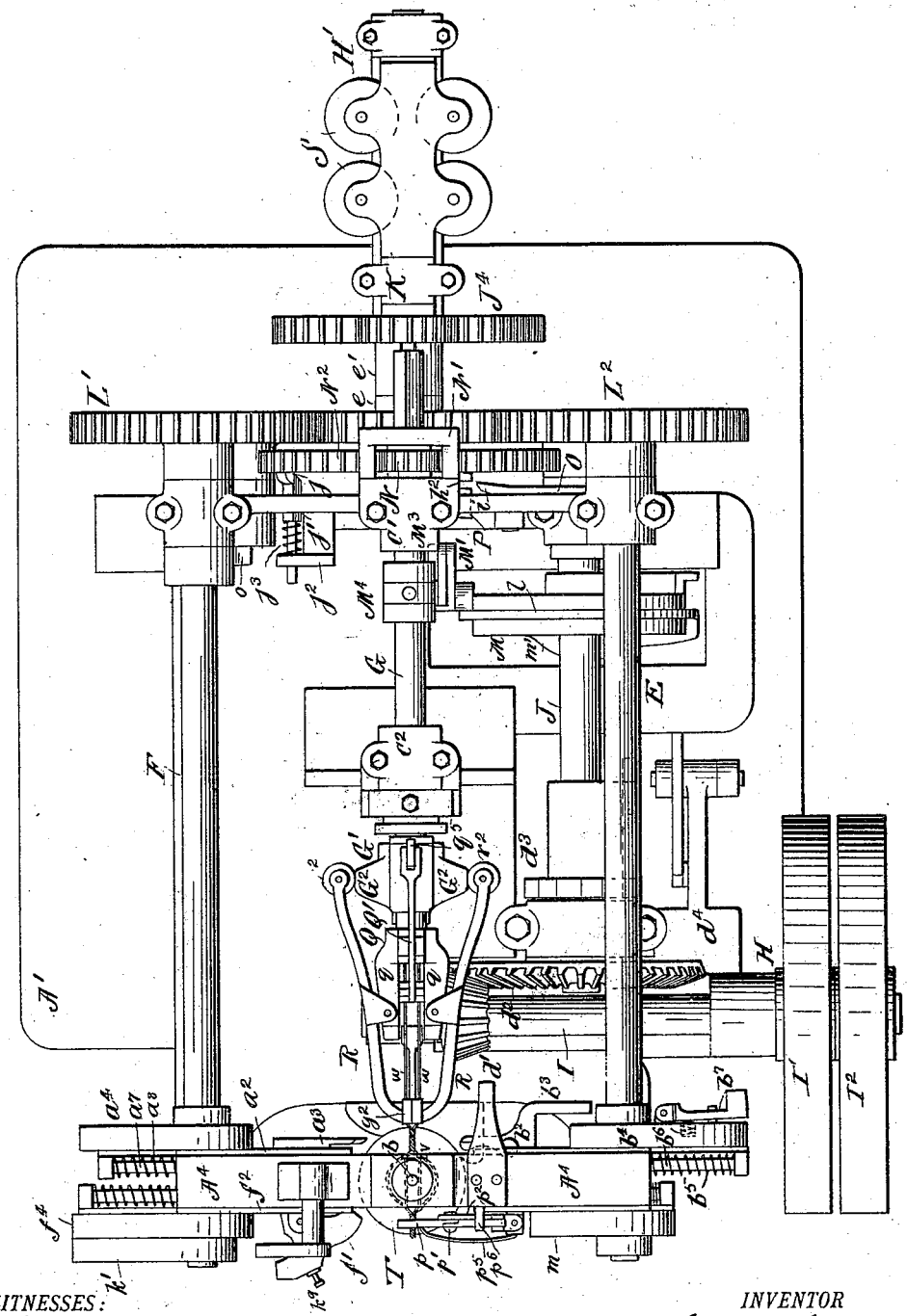
Figure 4:
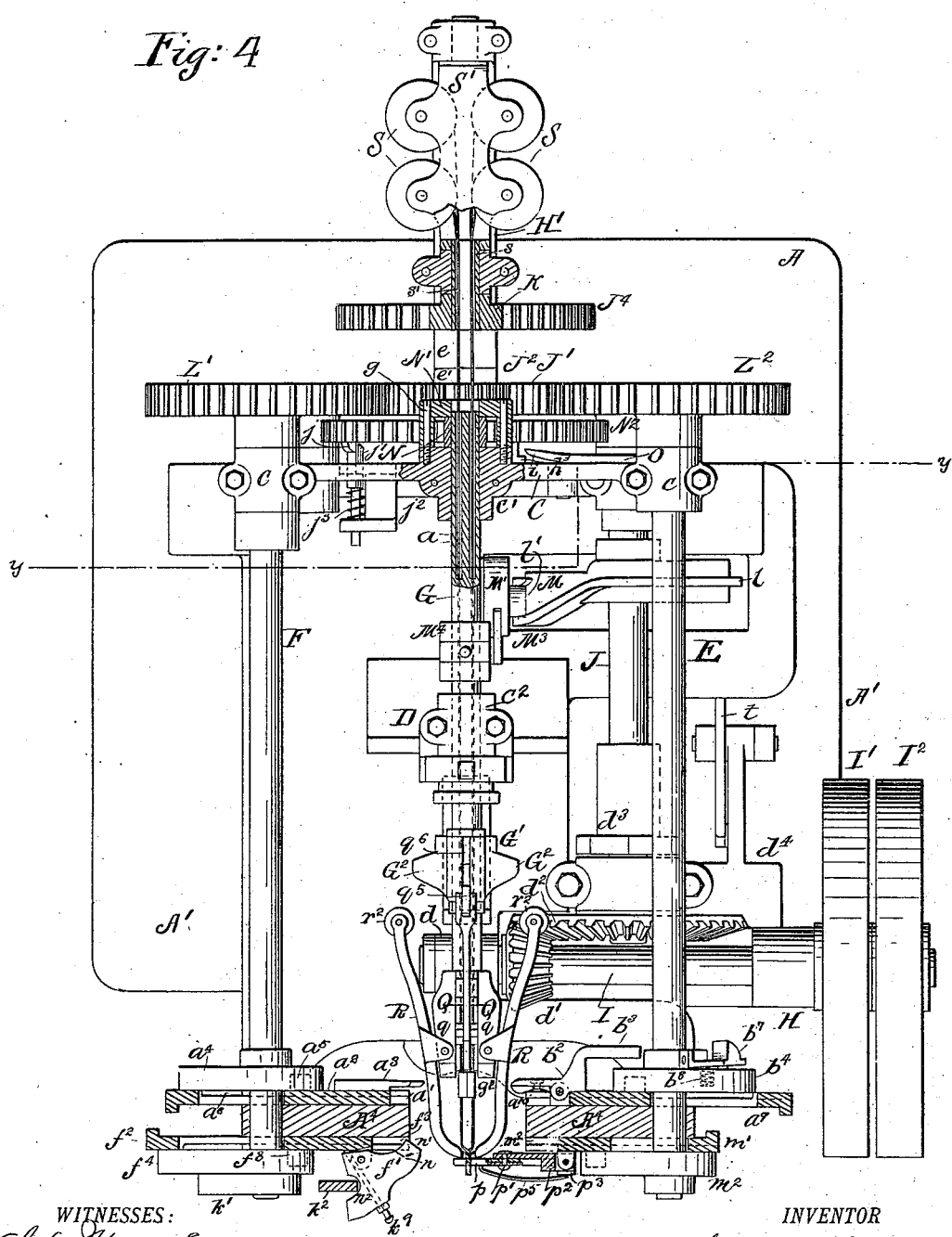
Figure 5:
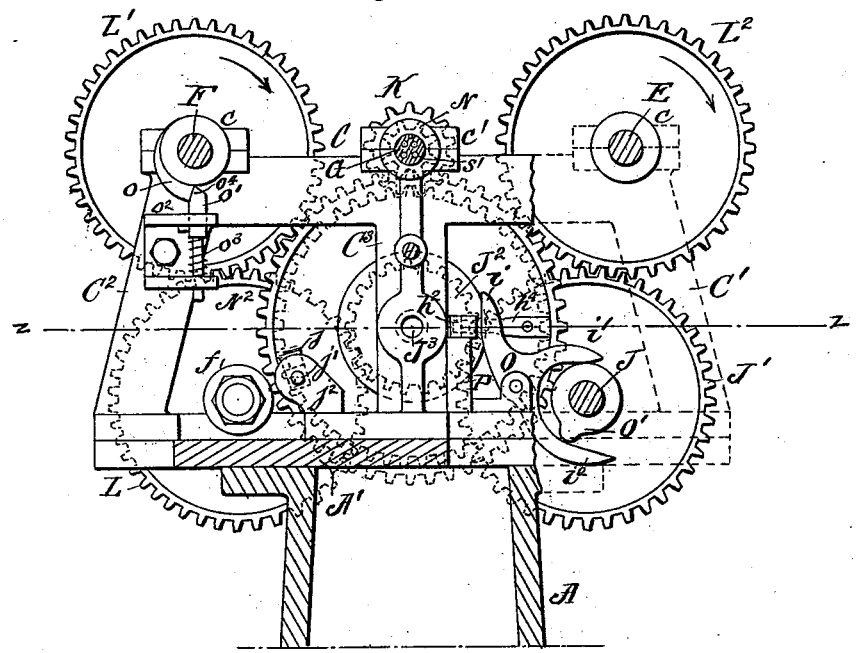
Figure 6:
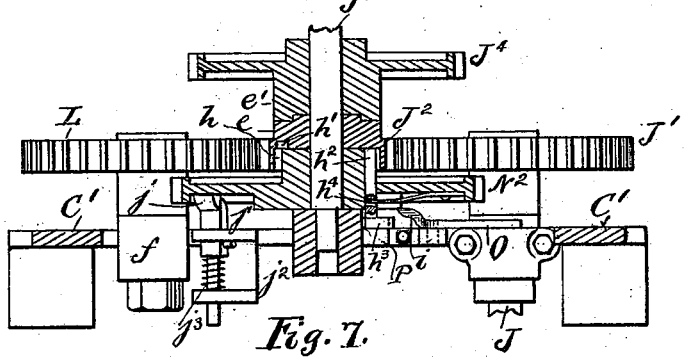
Figure 7:
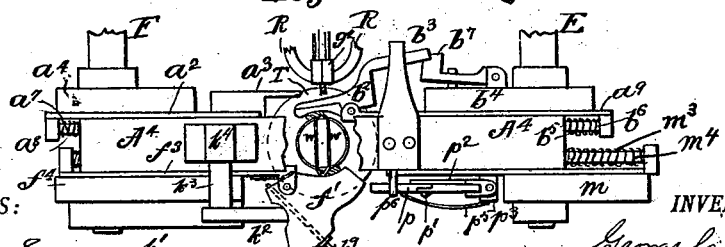

In the accompanying drawings, to which reference is made, and which form a part of this specification—Figure 1 is a front elevation of my new and improved bottle wiring machine, the parts being shown in the position they assume when ready for the insertion of a bottle to be wired. Fig. 2 is a side elevation of the machine showing the power shaft and its bracket in section taken on line $x\ x$ of Fig. 1, and showing the shaft E broken away. Fig. 3 is a plan view of the machine, the parts being shown in the position they assume just before the twist is cut. Fig. 4 is a sectional plan view. Fig. 5 is a transverse sectional elevation on line $y\ y$ of Fig. 4. Fig. 6 is a detailed sectional plan view on line $z\ z$ of Fig. 5. Fig. 7 is a detailed and broken plan view showing the parts in the position they assume after the wire is cut and the twists folded down. Fig. 8 is an enlarged sectional plan view of the twisting head and its shaft and cam-block for actuating the arms or jaws. Fig. 9 is a sectional side elevation of the same. Figs. 10, 11, 12 and 13 are diagrams of the cams for operating the cutters, turning down devices and front nippers. Fig. 14 is a sectional view of the cams for operating one of the knives and the front bending finger. Fig. 15 is a front elevation of the bell-crank cam for starting and stopping the machine, and Fig. 16 is a front elevation of the wire retaining finger.

A represents the base or standard of the machine, to the top or head plate A' of which are secured the two opposite and upright posts $A^2\ A^3$ provided at their upper ends with a front bridge piece $A^4$ (see Fig. 1) elevated and recessed at the center as shown at $A^5$ to receive the vertically movable and spring actuated presser block B for pressing the wires down upon the cork, or rather, in contact with which the cork is pressed, when the bottle is forced up in the machine to be wired, to retain the center wire or wires on the corks. The bridge piece $A^4$ may be cast in one piece with the upright posts $A^2\ A^3$ forming an arch or it may be a separate piece bolted to the posts, and the said bridge piece may be made in two parts if desired and united by a cap plate $A^6$, if desired, through which the stem $b$ of the follower B works, and which retains the spiral spring $b'$ placed on said stem to press the follower downward.

At the rear of the top plate A' is secured a skeleton upright C (see Fig. 5), formed with side legs $C'\ C^2$ and with a center piece $C^3$; and the center of said main top plate A' is provided with an upright D. The said skeleton upright C is formed with journal boxes $c\ c$ for the rear ends of the shafts E F, while the front ends of these shafts are journaled in the upright posts $A^2 A^3$ or in the ends of the bridge $A^4$; and said skeleton upright is also formed with a journal box $c'$ for the rear end of the central rotating and reciprocating twisting head shaft G which is longitudinally pierced with four holes $a$ for the passage through it of the wires from the spools S, at the rear of the machine. The front end of this shaft G is held in a journal box $c^2$ formed at the top of the central upright D and it carries at its front end the twisting head shown in Figs. 8 and 9, comprising the twisting jaws and other parts hereinafter described.

H represents a heavy side bracket in which is journaled the power shaft I provided with fixed and idle pulleys $I'\ I^2$. The inner end of this power shaft is journaled in a box $d$ at the center of the machine, and it is provided with a beveled pinion $d'$ which meshes with the beveled gear wheel $d^2$ on the front end of the counter-shaft J. The rear end of this counter shaft is provided with a gear wheel J' (see Fig. 5) which meshes with a pinion $J^2$ on the short shaft $J^3$. (See Fig. 6.) This pinion $J^2$ acts as one with the gear wheel $J^4$ by having their hubs $e\ e'$ joined together, or otherwise. The rear end of the shaft $J^3$ is journaled in the rear bracket $H'$ and the gear wheel $J^4$ meshes with a pinion K, secured to the gudgeon $s$ (see Fig. 4) of the spool frame $S'$, which is journaled in the said bracket $H'$. The gudgeon $s$ is formed with a passage $s'$ through it for the wire from the spools $S'$. The pinion $J^2$ (see Fig. 5) meshes with the gear wheel L, attached to a short shaft journaled in a box formed at the rear edge of the top plate, and this gear wheel meshes with a gear wheel $L'$ of the same size secured to the rear end of the shaft F. The gear wheel $L^2$ attached to the rear end of the shaft F meshes directly with the gear wheel $J'$ so that the shafts E F both receive motion from the same primary gear wheel and both revolve in the same direction as indicated by the arrows in Fig. 5.

The central shaft G is reciprocated in its bearings from the position shown in Fig. 4 back to that shown in Fig. 3—by the cam M attached to the counter-shaft J and the lever $M'$ (see Fig. 2) pivoted at its lower end at $M^2$ and connected at its upper end by a link $M^3$ to a yoke $M^4$ connected to the said shaft G and guided upon a rod $M^5$. In its reciprocating movement the shaft G slides through a small pinion N (see Fig. 4) connected to the shaft by a spline and held in contact with the journal box $c'$ by a yoke $N'$ held to said journal box by bolts or screws, $g\ g$. The said pinion, N, meshes with the large gear wheel $N^2$ (see Figs. 5 and 6) journaled on the shaft $J^3$ in front of the pinion $J^2$ and is adapted to be clutched to the said pinion $J^2$ to be revolved thereby at the proper interval for rotating at the proper time through pinion N the shaft G. It will be understood that while the machine is in operation the pinion $J^2$ and all of the other gearing are revolved continuously by the primary gear-wheel $J'$, but that the gear wheel $N^2$ and pinion N are retarded until the shaft G has reached the limit or nearly the limit of its backward movement. The clutching of pinion $J^2$ to the gear wheel $N^2$ is effected as follows: The said pinion is chambered at its front surface as shown at $h$ (Fig. 6) to inclose a portion of the hub of the gear wheel $N^2$ and in this chamber is formed a notch or socket $h'$. In the hub of the gear wheel $N^2$ is fitted a sliding block $h^2$ which reaches through the web of the wheel, and at its front end it is formed with a lateral arm $h^3$ and spring $h^4$ riveted to the front surface of the gear wheel $N^2$, which enters an aperture in the block $h^2$ and acts to constantly press the said block backward to cause it to enter the socket $h'$ and thus clutch the gear wheel $N^2$ to the pinion $J^2$. The said lateral arm $h^3$ is beveled as shown at $h^5$, Fig. 2, so that when, in the revolution of the gear wheel $N^2$, it reaches the beveled point $i$ of the reciprocating lever O, the block will be forced thereby as by a cam forward against the pressure of the spring $h^4$ and thus disconnect the gear wheel $N^2$ from the pinion $J^2$. The lever O, is preferably formed as shown in Fig. 5 with two arms $i'\ i^2$ which straddle the counter shaft J and the cam $O'$ thereon which acts, first, in contact with arm $i'$ to tilt the point $i$ within the path described by the lateral arm of the block $h^2$, and, secondly, to contact with the arm $i^2$ to tilt the lever back to its normal position as shown in Fig. 5. The said clutch block $h^2$ also serves the purpose of stopping the gear wheel $N^2$, pinion N and shaft G at the proper point by striking upon the top of the post P when withdrawn by the cam $i$ as shown clearly in Figs. 5 and 6. It will be understood that the speed of revolution of the pinion N and shaft G is comparatively rapid and that the momentum of the shaft G and the twisting head attached to it is considerable and that any sudden arresting of the revolution of the shaft G would rack the twisting head. To obviate this, the cam point $i$ of the lever O is elevated above the post P so that the gear wheel $N^2$ is disconnected from the pinion $J^2$ before the clutch block $h^2$ reaches the said post and the momentum of the parts is depended upon to complete the revolution of gear wheels $N'$, $N^2$, shaft G and twisting head; and to retard this momentum and ease these parts at the time they are brought to a state of rest I form on the front surface of the web of the gear wheel $N^2$ a beveled stud $j$ which strikes the oppositely beveled latch $j'$, held in a stationary U-block $j^2$. This latch is pressed backward by a spring $j^3$ of proper tension to properly retard the gear wheel $N^2$. At the time the clutch block $h^2$ reaches the top of the post P the latch $j'$ is forced back by its spring beneath the stud $j$ and thus in turn locks the gear wheel $N^2$, pinion N and shaft G and the twisting head against backward movement. The twisting head is attached to the front end of the said central shaft G by the body Q thereof the same being screwed upon said shaft as shown clearly in Figs. 8 and 9. The said body Q of the twisting head is bifurcated or formed with arms $q\ q$ and to the under surface of said arms is secured a bridge $q'$ on which is placed between said arms a face plate $q^2$ to act as an abutment in connection with the upper tension arm $Q'$ and the pivoted block $q^3$ thereof to grasp at the proper time the central wires $w\ w$ which go over the top of the cork and prevent slack in the wire and cause a tight twist to be formed.

As above described the shaft G has four passages $a$ through it, the two upper ones for the wires $w\ w$, the two lower for the two neck wires, $w'$, $w'$, which latter are led from the shaft G through the lateral tubes $q^4\ q^4$ fitted in the arms $q$ of the body, thence through apertures $r\ r$ in the jaws R R along the outside of the jaws and finally through the eyes $r'\ r'$ at the points of the jaws where they meet the central wires $w\ w$ as shown clearly in Fig. 8.

The jaws R R are made of the form shown in Fig. 8 and are pivoted to the arms $q\ q$ of the body and may be provided at their rear ends with anti-friction wheels $r^2 r^2$ which, when the shaft G is moved backward by the cam M, strike the beveled arms or lugs $G^2 G^2$ on the sides of the block G', and thus close the points of the jaws rigidly together or in close proximity to one another for gathering the wires together preparatory to twisting. At the same time the rear end of the tension arm Q' and the anti-friction wheel $q^5$ thereof ride out upon the cam $q^6$ attached to the block G' for firmly grasping the central wires $w\ w$ between the face blocks $q^2\ q^3$.

To the block G' is attached the arm $G^3$ which slides in the bearing $G^4$ formed on the under surface of the body Q of the twisting head. This arm is flattened at its front end to form the plate $G^5$ having a stop shoulder $g'$ and is provided at its front end with the eyes $g^2\ g^2$ for the central wires $w$, which prevent the spreading of the said wires when the neck of the bottle to be wired is inserted. On the arm $G^3$ is placed a coiled spring $g^3$ which acts between the bearing $G^4$ and the block G' for forcing the said block backward on the shaft G and this backward movement is limited by the shoulder $g'$ striking against the bridge $q'$. The block G' is prevented from turning on the shaft G by the said arm $G^3$ and the anti-friction wheel $q^5$ resting in the groove $q^7$. The said block G' is provided with a vertically sliding bolt $g^4$ for locking the block G' to the shaft G at the time the shaft reaches the limit of its backward motion. This is effected by a spring $g^5$ acting on the back of the trip lever $g^6$ which lever is provided with an arm $g^7$ which enters an aperture in the bolt $g^4$ and forces the same up into the socket $g^8$ formed in the shaft G as shown clearly in Fig. 9. When the block G' is thus locked to the shaft G, the points of the jaws R are held in closed position and the rear end of the tension lever Q' is also lifted so as to cause face block $q^3$ to grasp the center wires firmly on the face block $q^2$, so that when the shaft G is moved forward, the wires will be drawn forward from the spools. Just before the shaft G reaches the limit of its forward movement (the position shown in Fig. 4) the trip lever $g^6$ strikes the post $g^9$ (see Figs. 2 and 9) and withdraws the bolt $g^4$ from the socket in the shaft G and thereupon the spring $g^3$ forces the block G' and arm $G^3$ back until the shoulder $g'$ of the arm strikes the edge of the bridge $q'$ as above mentioned, thus relieving the jaws and the lever Q' and returning the eyes $g^2$ to the position shown in Figs. 4 and 9 ready for the insertion of the neck of the bottle between the said eyes and the points of the jaws.

At the time the twisting head shaft G is forced back by the cam M to the position shown in Fig. 3 causing the members of the twisting head to be operated from contact with the constituent parts of the block G' and the pin $g^4$ enters the socket in the shaft as above described. At this time the clutch block $h^2$ locks the gear wheel $N^2$ to the pinion $J^2$, and the shaft G, block G' and twisting head are all revolved forming a twist in the wires, as shown in Fig. 3. In this instance the twisting head is given six complete revolutions during the time the flange $l$ of the cam M retains the shaft G in its backward position. Then the groove $l'$ in the cam M forces the shaft and twisting head forward to normal position causing the trip lever $g^6$ to strike the arm $g^9$, thus unlocking the block G' from shaft G and then the spring $g^3$ acts to force the block G' to its normal position shown in Figs. 2 and 4 at which time all of the parts come to rest save the shaft I and beveled gear wheels $d'\ d^2$ which revolve continuously, the latter being provided with a clutch $d^3$ for putting the machine in gear by means of a treadle $d^4$ as hereinafter described.

Referring now to the front of the machine, the inner surface of the arch or bridge piece $A^4$ at one side of its central recess is channeled or otherwise constructed to form a race or way $a'$, as shown in Fig. 4, in which is placed a slide $a^2$ which is provided with one of the cutters $a^3$ for severing the wires. The slide and cutter are reciprocated in said way by a cam $a^4$ on the shaft F and stud $a^5$ on the slide, said slide being formed with a clearance $a^6$ for the shaft and it is also formed or provided with a rod $a^7$ on which is placed a coiled spring $a^8$ which serves to keep the stud $a^5$ constantly in contact with the working face of the cam.

$a^9$ represents an opposite, but similar, slide to that of $a^2$ held in a way $a^{10}$ formed in the opposite side of the arch or bridge piece $A^4$. To the inner end of this slide is pivoted the blade $b^2$ the body of which is formed or provided with an arm $b^3$. The said slide $a^9$ is reciprocated in its way by a cam $b^4$ secured on the shaft E and is acted upon by a spring $b^5$ on rod $b^6$ to return it to normal position. The blades $a^3\ b^2$ operated by cams $a^4\ b^4$ acting on the slides $a^2\ a^9$ approach one another simultaneously and serve to cut the wire in the twist formed by the twisting head between the neck of the bottle T and the points of the jaws R, R, as shown in Figs. 3 and 7. The blade $b^2$ also serves to turn down the inner twist next to and under the neck of the bottle. This operation is illustrated in Fig. 7 and one means of accomplishing the movement is here illustrated consisting of a cam $b^7$ at the side of the cam $b^4$ which at the time the twist is severed strikes the arm $b^3$ and turns the point of the blade toward and around the neck of the bottle causing it to bend down the twist as shown in Fig. 7. The cam $b^7$ is pivoted to the surface of the cam $b^4$ and is pressed outward by a spring $b^8$ to obviate too rigid action against the arm $b^3$ and to adapt the blade to bottle necks of different sizes.

The front twist in the wire is turned down simultaneously with the inner twist by the finger $f'$ pivoted to the end of slide $f^2$ which is held in a way $f^3$ formed at the front of the arch or bridge $A^4$. This slide is similar in construction to that of slides $a^2$ $a^9$ and is reciprocated by a cam $f^4$ on the front end of the shaft F, and the said slide is acted upon by a coiled spring $f^6$ (see Fig. 1) on rod $f^7$ for keeping the roller or stud $f^8$ in contact with the working face of the cam.

The cam $f^4$ is formed with a groove $k$ as shown in Figs. 10 and 14 in its inner surface and its outer surface is provided with an auxiliary cam $k'$ for operating the finger $f'$ on its pivot through the pawl $k^2$ pivoted on a stud $k^3$ held by a block $k^8$ secured upon the bridge $A^4$.

The auxiliary cam $k'$ is a yielding cam. It is by preference formed as shown in Figs. 1 and 14 with an oblong opening $k^4$ to fit over a boss on the adjacent face of the cam $f^4$ and with slots or oblong openings $k^5$ $k^5$ (see Fig. 1) for the passage of bolts $k^6$ $k^6$ which hold it to the face of the cam $f^4$. A spring $k^7$ is interposed between the boss and the auxiliary cam to constantly force the cam outward away from the boss and said spring is of sufficient strength to cause finger $f'$ to bend down the coil next to the bottle and yet yield sufficiently to obviate breaking the bottle and adapting the finger to accommodate itself to bottle necks of different sizes within a reasonable limit.

The finger $f'$ may be adjusted on its pivot by a screw $k^9$ which operates a plug to impinge on the slide $f^2$ back of the pivot so that the finger may be properly set for larger or smaller necked bottles. The slide $f^2$ when forced forward by the cam $f^4$ simply carries the finger $f'$ against the twist and thus tips it to one side; this done the auxiliary cam $k'$ strikes the pawl $k^2$ and causes it to turn the finger $f'$ on its pivot causing the end of the finger to approach the neck of the bottle performing a curvilinear movement which places the twist properly beneath the neck of the bottle and for the purpose of properly manipulating the twist the point of the finger $f'$ is formed with an inner curve $n$ and a diagonal end $n'$. The rear portion of the finger is by preference slightly recessed as shown at $n^2$ to properly engage the pawl $k^2$.

$m$ represents a cam secured upon the front end of the shaft E. This cam is grooved as shown in Fig. 12, and serves to reciprocate the slide $m'$ held in a way $m^2$ formed in the front of the bridge $A^4$. (See Fig. 4.) This slide is returned by a spring $m^3$ placed on a rod $m^4$ and to it are attached the front nippers $p$ $p$ for grasping and retaining the twist next to the points of the jaws R R as shown in Fig. 4. These nippers are duplicates of each other, and of the form shown in Fig. 1, and are cross-pivoted on pin $p'$ which connects the nippers to a frame $p^2$ which is itself pivoted to lug $p^3$ on the front of the slide $m'$. The said pivoted frame is formed with arms $p^4$ $p^4$ which are slotted to form guides for the opening and closing of the nippers. A U-shaped spring $p^5$ is attached to the members of the nippers for opening them. The arms of the said spring $p^5$ are curved outward as shown in Figs. 3 and 7, and the folded end bears upon the stud $p^3$ so that besides opening and closing the nippers it also serves to hold the nippers in position by a yielding pressure. The ends of the said nippers $p$ are each extended and rounded as shown in Fig. 1, and when the slide $m'$ is forced forward by the cam $m$ these extended and rounded portions are thrust against fixed pins $p^6$ $p^6$ which serve to close the nippers at the proper time to grasp and hold the front twist as shown in Figs. 1 and 3.

The treadle $d^4$ is connected by a rod $t$ to the bell-crank $t'$ pivoted on the stud $t^2$ (see Fig. 2) and said bell-crank is formed with a cam $t^3$ shown in dotted lines in Fig. 1, which actuates a lever $t^4$ pivoted in an arm $t^5$ secured to the shaft J adjacent to the clutch $d^3$ the same being a star-wheel as shown in dotted lines in Fig. 1. This clutch $d^3$ is attached to the boss of the beveled gear-wheel $d^2$ which normally turns on the shaft J in the box $t^6$. When the treadle $d^4$ is depressed, it swings the cam or upper member of the bell-crank back from engagement with the rear end of the lever $t^4$ whereupon the spring $t^7$ throws the front end of said lever into engagement with the clutch $d^3$ and thus locks the beveled gear wheel $d^2$ to the shaft J and sets the whole machine in operation. A spring $t^8$ returns the treadle and the bell-crank lever to normal position so that when the shaft J, arm $t^5$ and clutch lever $t^4$ have made a complete revolution the cam $t^3$ acts to detach the lever $t^4$ from engagement with the clutch $d^3$, and automatically throws the machine out of gear, which takes place after the gear wheel $N^2$ is unclutched from the pinion $J^2$ and before the rear gear wheels have completed a revolution, and also before the lever $t^4$ strikes the stop $t^9$ of the bell-crank $t'$ and thus the momentum of the spool frame $S'$ and spools is depended upon to complete the revolution. This action is controlled by a cam $o$ on the shaft F and a beveled latch $o'$ (Fig. 5) held in a U-plate $o^2$ bolted to the upright $C^2$ and acted upon by a spring $o^3$ and the said latch $o'$ is formed with a beveled face $o^4$ to engage with the cam $o$, so that any tendency of the wheel $L'$ to recoil will not be rigidly resisted by the latch.

V (Fig. 1) represents a guide preferably faced with corrugated rubber against which the body of the bottle to be wired is held by the attendant and $v$ (Figs. 1, 3 and 16) represents a wire retaining finger secured to the inner face of the arch or bridge piece $A^4$. This finger is preferably formed at its lower end with notches $v'$ $v'$ to receive the central wires $w$ $w$ and with a central point or projection $v^2$ to spread the said two wires and cause them to be properly placed upon the top of the cork when the bottle is forced up against said wires, as will be understood clearly from Fig. 9 and the dotted lines in Fig. 1.

Having thus described my invention, what I claim, and desire to secure by Letters Patent, is—

1. In a machine for wiring corks in bottles, the main frame formed with an arch at the front, combined with a power shaft and counter-shaft arranged below the bridge piece of said arch, and the shafts E and F journaled in the arch and in uprights at the rear of the frame, substantially as described.

2. In a machine for wiring corks in bottles, the main frame provided with a bridge piece, and the intermittently rotating shafts journaled at each side of said bridge piece and provided with cams at their front ends, in combination with the twisting head and the twisting-head shaft journaled between said intermittently rotating shafts back of the bridge piece, and means substantially as described for reciprocating and rotating said twisting-head shaft, substantially as described.

3. In a machine for wiring corks in bottles, the bridge piece recessed at the center and provided with ways at its front and rear surfaces, combined with the shafts provided with cams at the front and back of said bridge piece, and four slides fitted in said ways and reciprocated by said cams, two of said slides being provided with cutters, a third slide with a bending finger, and the fourth slide with front nippers, substantially as described.

4. The main frame provided with front uprights $A^2$ $A^3$, rear uprights C, and central upright D, and the shafts E F and central twister-head shaft G, in combination with the intermittently rotating counter-shaft J, a cam thereon for reciprocating the said twister-head shaft, a gear wheel J', meshing with a gear wheel $L^2$ on shaft E and with a pinion $J^2$, and the gear wheel $N^2$ adapted to be clutched to the said pinion, and meshing with a pinion N on the said twister-head shaft, and through which the twister-head shaft moves, substantially as described.

5. The pinion $J^2$, interposed between the gear wheels J' L and formed with a clutch-recess, in combination with the gear wheels $N^2$ $J^4$ and pinion N and a sliding clutch block $h^2$ reaching to the front of gear wheel $N^2$, and a spring and reciprocating lever for operating said clutch block, substantially as described.

6. In a machine for wiring corks in bottles, the gear wheel $N^2$, and pinion $J^2$, and the clutch in combination with the pinion N, the twister-head and twister-head shaft working in said pinion N, and stop j' and stud j on the gear wheel $N^2$, substantially as described.

7. In a machine for wiring corks in bottles, the gear wheel $N^2$ formed with a stud j and carrying a sliding clutch block, and meshing with a pinion on the twister-head shaft, in combination with a spring actuated stop j' and a post P located in the path of the inner end of the clutch block, substantially as described.

8. In a machine for wiring corks in bottles, the twister-head, and the twister-head shaft and the pinion through which it slides, combined with the gear wheel $N^2$ and a yielding stop applied to said gear wheel, substantially as described.

9. In a machine for wiring corks in bottles, the gear-wheel $J^4$ for turning the spool-frame, and the pinion $J^2$, gear-wheels J' L and $L^2$ on shaft F, in combination with the yielding stop and the twisting-head shaft held in line with the spools, and the twisting head attached to said shaft, substantially as described.

10. In a machine for wiring corks in bottles, the gear-wheel $J^4$ for turning the spool frame, and the pinion $J^2$, gear-wheels J' L $L^2$ and shaft F, in combination with the twisting head and its shaft held in line with the spool frame, and a cam o applied to the said shaft F, and a yielding stop o', substantially as described.

11. The twisting-head shaft G, provided with the twisting head at its front end and formed with a recess $g^8$, and the block G' through which said shaft reciprocates, in combination with the arm $G^3$ attached to the said block and projected forward from said shaft, spring $g^3$ placed on the said arm, bolt $g^4$, and lever $g^6$ carried by said block, the fixed stop $g^9$ attached to the frame, and the spring $g^5$, arranged to press the said lever forward, the arm $G^3$ being formed with a shoulder to limit the backward movement of the block G' upon the twisting-head shaft, substantially as shown and described.

12. The bridge $A^4$ $A^4$ of the main frame provided with a follower at the center to hold down the wires and formed with ways a' $a^{10}$ in the inner face, in combination with the shafts E F, cams $a^4$ $b^4$ secured upon said shafts, and the slides $a^2$ $a^9$ fitted in said ways and reciprocated by said cams, the said slides being provided with cutters at their adjacent ends, substantially as shown and described.

13. The bridge $A^4$ $A^4$ formed with ways at the outer surface and the shafts E F and cams $f^4$ and $m^2$, in combination with slides fitted in said ways and operated by said shafts and cams, one of said slides being provided with a bending finger, the other with the front nippers, substantially as described.

14. The slide $a^9$ fitted to operate in a way formed in the inner surface of the bridge $A^4$ and the blade $b^2$ hinged to said slide and formed with an arm $b^3$, in combination with a cam for reciprocating said slide and a lateral cam $b^7$ for reciprocating the said blade, substantially as described.

15. The slide m' fitted to operate in a way in the front surface of the bridge $A^4$ and the front nippers p p pivoted to the end of said slide, in combination with a cam m for reciprocating said slide, and stop lugs or pins $p^6$ for closing said nippers, substantially as described.

16. The front nippers p p attached to a reciprocating slide and a U-shaped and outwardly curved spring for opening the jaws, and the fixed studs $p^6$ for closing said jaws, substantially as described.

17. The slide $f^2$ fitted to operate in a way formed in the surface of the bridge $A^4$, in combination with a cam for reciprocating said slide and the curved bending finger $f'$ pivoted to the end of said slide, substantially as described.

18. The cam $f^4$ and an auxiliary cam, in combination with the reciprocating slide $f^2$ curved bending finger and pawl $k^2$ arranged to be acted upon by the auxiliary cam and to turn the bending finger on its pivot, substantially as described.

19. The cam $f^4$ secured to the shaft F and provided with a yielding auxiliary cam, in combination with the slide $f^2$, and a bending finger for the twist hinged to the said slide, substantially as shown and described.

20. In a machine for wiring corks in bottles, the shaft F formed or provided with a cam $o$, in combination with a spring-actuated latch having a front beveled face to engage with said cam, the gear-wheel L', pinion $J^2$, gear-wheel $J^4$, and pinion K on the spool frame, substantially as shown and described.

GEORGE C. COON.

Witnesses:
H. A. WEST,
H. R. RICHARDS.